US006782518B2

(12) United States Patent
Decker

(10) Patent No.: US 6,782,518 B2
(45) Date of Patent: Aug. 24, 2004

(54) SYSTEM AND METHOD FOR FACILITATING COVERAGE FEEDBACK TESTCASE GENERATION REPRODUCIBILITY

(75) Inventor: Mark H. Decker, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/109,502

(22) Filed: Mar. 28, 2002

(65) Prior Publication Data

US 2004/0078673 A1 Apr. 22, 2004

(51) Int. Cl.[7] .............................................. G06F 17/50
(52) U.S. Cl. ................................ 716/5; 716/4; 703/13; 714/741
(58) Field of Search .................... 716/5, 4; 703/13, 703/14, 7; 714/724, 728, 738, 739, 741

(56) References Cited

U.S. PATENT DOCUMENTS

| | | | | |
|---|---|---|---|---|
| 3,764,995 A | * | 10/1973 | Helf et al. ..................... | 714/32 |
| 4,513,418 A | | 4/1985 | Bardell, Jr. et al. ........... | 371/25 |
| 4,519,078 A | | 5/1985 | Komonytsky ................ | 371/25 |
| 5,202,889 A | | 4/1993 | Aharon et al. ................ | 371/27 |
| 5,475,608 A | * | 12/1995 | Masuoka ........................ | 716/8 |
| 6,041,419 A | | 3/2000 | Huang et al. ............... | 713/401 |
| 6,041,429 A | | 3/2000 | Koenemann ................ | 714/738 |
| 6,125,359 A | | 9/2000 | Lautzenheiser et al. ....... | 706/60 |
| 6,212,667 B1 | | 4/2001 | Geer et al. ..................... | 716/6 |
| 6,397,169 B1 | * | 5/2002 | Shenoy et al. ................ | 703/14 |
| 6,584,598 B2 | * | 6/2003 | Rao et al. ...................... | 716/2 |
| 6,634,017 B2 | * | 10/2003 | Matsui et al. ................. | 716/11 |

FOREIGN PATENT DOCUMENTS

EP          0549949 A2     7/1993

OTHER PUBLICATIONS

A.K. Chandra, V.S. Iyengar, R.V. Jawalekar, M.P. Mullen, I.Nair, and B.K. Rosen, "Architectural Verification of Processors Using Symbolic Instruction Graphs," 1994, pp. 454–459.

A. Chandra, V. Iyengar, D. Jameson, R. Jawalekar, I. Nair, B. Rosen, M. Mullen, J. Yoon, R. Armoni, D. Geist and Y. Wolfsthal AVPGEN—A Test Generator for Architecture Verification, IEEE Transactions on Very Large Scale Integration Systems, vol. 3, No. 2, Jun. 1995 pp. 188–200.

* cited by examiner

Primary Examiner—Leigh M. Garbowski
Assistant Examiner—Chuong Anh Luu
(74) Attorney, Agent, or Firm—Cantor Colburn LLP; Andrew Wojnicki, Jr.

(57) ABSTRACT

An exemplary embodiment of the invention relates to a system and method for facilitating coverage feedback testcase generation reproducibility. The system comprises: a testcase generator comprising an instruction generator and an instruction simulator; an internal coverage domain accessible to the testcase generator, a regeneration file storing updated testcase data; and a temporary holding structure. The internal coverage domain comprises: coverage domain elements; a session component; and a prior cumulative history component. Upon generating a testcase by the testcase generator, a regeneration file is constructed utilizing testcase data updates acquired during execution of the testcase. The updates are provided by the temporary holding structure. The invention also comprises a method and storage medium.

4 Claims, 12 Drawing Sheets

ENABLE MNEM(LTR) ARCH(S390) LEVEL(Host) XLAT(Real) AMODE(31) TYPE(CCs)

FIG. 2A

ENABLE MNEM(L) ARCH(S390) LEVEL(Host) XLAT(Primary, Secondary) AMODE(31)
TYPE(EXCEPTIONS(PageTrans, SegTrans))

FIG. 2B

ENABLE IFETCH ARCH(S390) LEVEL(Host) XLAT(Real,AR) AMODE(31)
TYPE(EXCEPTIONS)

FIG. 2C

ENABLE MNEM(BSA) ARCH(ESAME) XLAT(PRIMARY) AMODE(31) LEVEL(HOST)
BRANCH(TAKEN, NOTTAKEN)TYPE(EXCEPTIONS)

FIG. 2D

ENABLE SEQ(0)
ARCH(ESAME) LEVEL(Host) XLAT(Real) AMODE(64) MNEM(AR,SR) TYPE(CCs(0))
ENABLE SEQ(1)
MNEM(S,A) TYPE(CCs(0))
ENABLE SEQ(2)
MNEM(CLR,CL) TYPE(CCs(0)) ENDSEQ

FIG. 2E

```
csp2:sig
{ n1: CoverageSelected_Op n2 with Coverage(UncoveredSession),
    MachineStateCoverageSelect,NoIFetchException;
    end
n2: SVC;
    end
};

start csp2.n1;
```

FIG. 3

ENABLE MNEM(LPR) ARCH(ESAME) LEVEL(Host) XLAT(Real) AM(64) TYPE(CCs(0,1,2));
ENABLE MNEM(LTR) ARCH(ESAME) LEVEL(Host) XLAT(Real) AM(64) TYPE(CCs(0));

FIG. 9

```
test:sig
{
   n1: sequence(1..2 of CoverageSelected_Op;); with Coverage(Uncovered),
       MachineStateCoverageSelect,NoIFetchException;
       end
} start test:n1;
```

Testcase ID Entry = Testcase ID tag(AA) + Testcase ID Number

BB|22|1421|01|00

Domain Element Entry = Domain Update tag(BB) + Instruction ID + State Info + Domain Entry Info Instruction ID = encoded ID for each available instruction (LPR=22)
State info = Architecture Info + Translation Info + Address Mode Info + Level Info Architecture Info = S/390(0) ESAME(1)
Translation Info = Primary(0), AR(1), Secondary(2), Home(3), Real(4)
Address Mode Info = 24(0), 31(1), 64(2)
Level Info = Host(1), Guest(2)

Domain Entry Info = Domain Entry Type + Domain Entry value

Domain Entry Type = Exceptions(0), CC(1),
Domain Entry Value = value of that type

FF

END tag - end of recorded testcases and coverage updates

FIG. 11

| CC | 22 | 1421 | 01 | 00 | BB | 22 | 1421 | 01 | 01 |

Domain Sequence Entries = 1..(s-1) of Domain Sequence Element Entry(ies) + Domain Element Entry Domain Sequence Element Entry = Domain Seq Update tag(CC) + Instruction ID + State Info + Domain Entry Info The domain element of the 2 instruction sequence of LPR{CC0} followed by LPR{CC1} is represented.

FIG. 12

SYSTEM AND METHOD FOR FACILITATING COVERAGE FEEDBACK TESTCASE GENERATION REPRODUCIBILITY

CROSS REFERENCE TO RELATED APPLICATIONS

This application is related to co-pending applications entitled "System and Method for Verifying Superscalar Computer Architectures", Ser. No. 10/113,756, and "System and Method for Facilitating Programmable Coverage Domains for a Testcase Generator", Ser. No. 10/113,319 which were both filed on Mar. 28, 2002 and are incorporated herein by reference in their entireties.

FIELD OF THE INVENTION

This invention relates to integrated circuit testing and, more particularly, the invention relates to a method and system for facilitating coverage feedback testcase generation reproducibility.

BACKGROUND OF THE INVENTION

The proliferation of modern electronics into our everyday lives is due in large part to the existence, functionality and relatively low cost of advanced integrated circuits. As technology moves ahead, the sophistication of integrated circuits increases. An important aspect of designing an advanced integrated circuit is the ability to thoroughly test the design of the integrated circuit to assure the design complies with desired architectural, performance, and design parameters. Testing a complex integrated circuit such as a superscalar microprocessor requires the generation of a large number of instruction sequences to assure that the microprocessor behaves properly under a wide variety of circumstances.

Verification techniques generally require automated testing systems that can turn out high volume testcases in an effort to sufficiently cover the realm of possible behaviors of the integrated circuit being tested. Testcases may be generated by a testcase generator in accordance with parameters specified in a file that are provided by a software design specialist or engineer, otherwise the generator generates random testcases.

Verification of microprocessors usually entails the definition of coverage domain(s) for use in measuring the effectiveness of various testcases and testcase generators. These domains are typically static once they are created and are persistent across the entire duration of the verification phase of a development cycle. The resulting coverage information from the testcase is collected and recorded for each entry in these domains and typically kept in a large central database as a cumulative history. These domains are typically a cross-product of various components of the machine state, instructions, and instruction results. For example, where an instruction="w", addressing mode(s)="x", translation mode(s)="y", and resulting condition codes="z", the corresponding state space would equal w*x*y*z. As one might suspect, this state space can grow quite large and maintaining records for each state can be memory/compute intensive. Further, adding sequences of events to the coverage domain would expand this state space exponentially.

When using this coverage domain information in a testcase generator employing an internal coverage feedback system for generating "interesting" (e.g., unusual, rare) testcases, maintaining the smallest domain is optimal. It would also be beneficial to generate testcases based only on what has transpired in the current generation session, in addition to referencing the total cumulative coverage history. Other desirable functions include generating a comprehensive test suite, allowing user control over coverage policies, profiling initialization settings, and profiling generation tools.

There may be times when it is desirable to reproduce a testcase that was generated with coverage feedback. One known method of reproducing a testcase is to regenerate all prior testcases 1, 2, . . . , n−1. This is slow and inefficient. When coverage feedback mechanisms are employed in testcase generation, the pseudo-random seed is not the only factor influencing decisions, but can also include the current state of the defined coverage domain element(s). Thus, the coverage state at the time of generating testcase 'n' must be reproduced.

SUMMARY OF THE INVENTION

An exemplary embodiment of the invention relates to a system and method for facilitating coverage feedback testcase generation reproducibility. The system comprises a testcase generator comprising an instruction generator and an instruction simulator; an internal coverage domain accessible to the testcase generator, a regeneration file storing updated testcase data; and a temporary holding structure. The internal coverage domain comprises: coverage domain elements; a session component; and a prior cumulative history component. Upon generating a testcase by the testcase generator, a regeneration file is constructed utilizing testcase data updates acquired during execution of the testcase. The updates are provided by the temporary holding structure. The invention also comprises a method and storage medium.

The above-described and other features and advantages of the present invention will be appreciated and understood by those skilled in the art from the following detailed description, drawings, and appended claims.

BRIEF DESCRIPTION OF THE DRAWINGS

FIGS. 2A–2E illustrate a sampling of user-defined coverage domains in an exemplary embodiment.

FIG. 3 is a sample instruction template illustrating user-defined inputs including a dynamic meta-mnemonic selected at generation time, a coverage policy, and machine state selection constraints.

FIG. 9 are sample instructions defining a coverage domain in an exemplary embodiment of the invention.

FIG. 10 is a sample instruction template illustrating a machine state coverage selected constraint.

FIG. 11 illustrates an exemplary format of the compressed update history file.

FIG. 12 illustrates an exemplary format for handling domain elements that are sequences of instructions and/or instructions results.

DETAILED EMBODIMENT OF THE INVENTION

This invention describes a method that enables the regeneration of a testcase that was generated using coverage feedback. It employs user-defined coverage domains and policy selection methods used in a feedback loop for testcase generation. When coverage feedback mechanisms are employed in testcase generation, pseudo-random seeds are only one of the factors influencing decisions. Another factor includes the current state of the defined coverage domain elements(s). The pseudo-random seed is utilized at each decision point to pick from a set of events and is updated after each decision. The starting seed for each testcase is recorded, which enables the same testcase to be regenerated. Thus, to reproduce testcase n, 1<=n<=N (N being the total number of testcases generated in the session), only seed 'n' is required to regeneration of the testcase 'n'. A generated testcase 'n' is independent of testcases 1 ... n−1 (e.g., does not rely on any information from previously-generated testcases).

Figure 1:
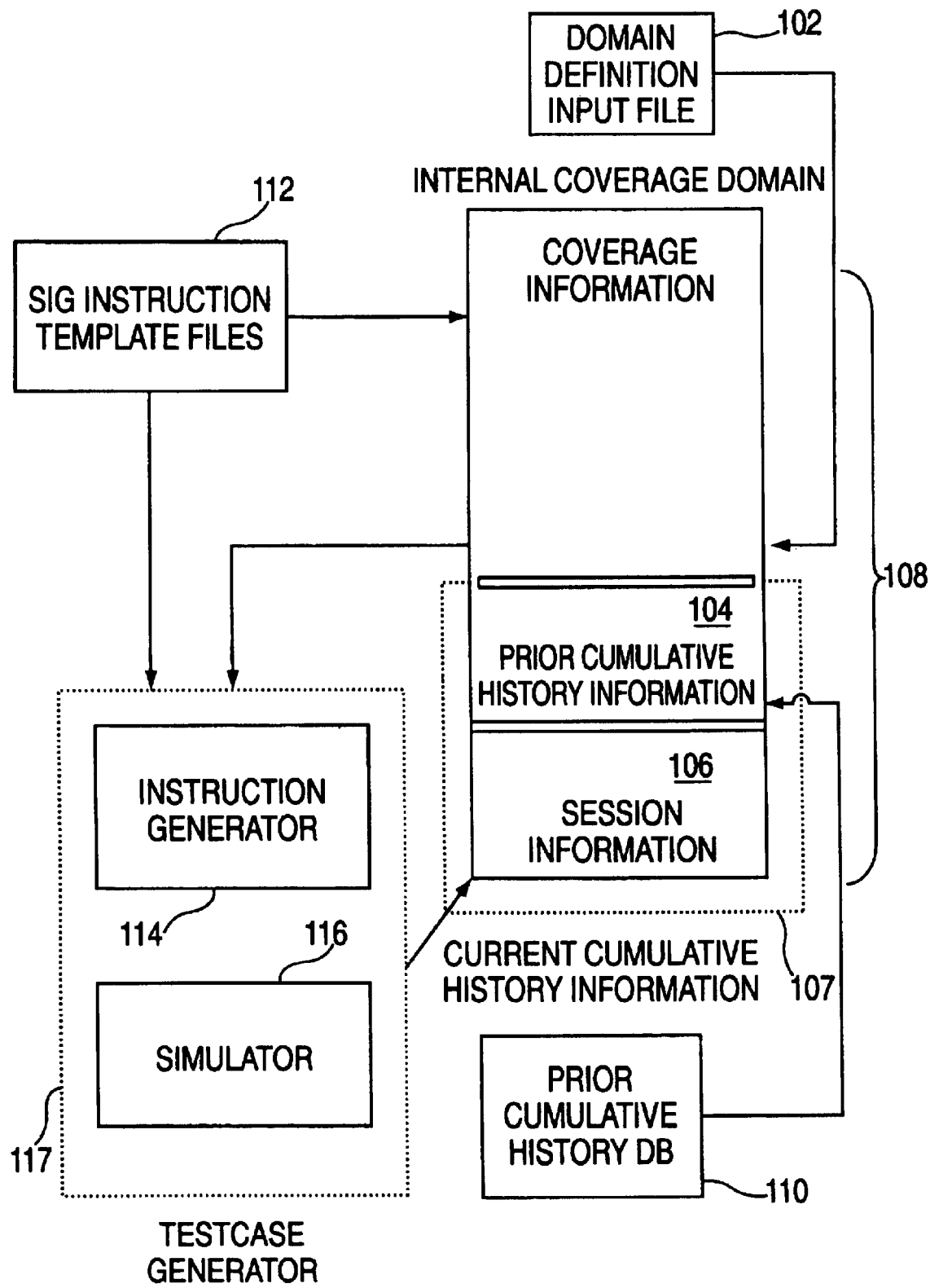
FIG. 1 is a block diagram illustrating the system components used in implementing the testcase reproducibility features of the invention in an exemplary embodiment.

FIG. 1 provides an overview of the elements that comprise an exemplary embodiment of the invention. A domain definition input file 102 is provided for defining the domain. An internal coverage domain 108 is constructed based upon the domain definitions. Domain definition input file 102 includes a syntax of keywords to describe the domains that are enabled, disabled, or those that reports are requested for. Each domain specified can be defined as small as one specific instance or can also encapsulate a set of elements. Internal coverage domain 108 comprises coverage information provided by domain definition input file 102 as well as information from current cumulative history component 107. Current cumulative history component 107 includes information from session component 106 and prior cumulative history component 104. Prior cumulative history information may be provided by prior cumulative history database 110.

Internal coverage domain 108 comprises a set of elements including the union of all 'enabled' user-defined domain descriptions, excluding all the 'disabled' user-defined domain descriptions. Each domain element represents one element of the cross-product of the state space. An element of the state space is composed of a sequence ($s_j$, where j=1 ... n) of architecture (a), machine level (1), addressing mode (m), translation mode (t), instruction (i) with a domain type (k) (e.g., the instruction action/result). A user-defined domain description can define from one to many domain elements of the state space. The state space of each sequence item is $s_j = a_j * 1_j * m_j * t_j * i_j * k_j$, thus the entire state space would be the product of each $s_j$ from j=1 to n.

Each domain element has information for the current generation session update count and the prior cumulative history update count from optionally imported database information. These counts record the number of occurrences of the domain element encountered. Additional counts are also included for recording the current generation session's number of attempts for each domain element, the number of duplicate updates encountered during simulation of instructions in the generation, as well as the number of aborts encountered. These additional counts are used for domain/tool profiling and effectiveness and efficiency checks. These counts are further described in FIGS. 4 and 5.

User-defined coverage domains are generated using various features provided via the domain definition input file 102 as described herein. 'Verb' items specify how to handle a particular domain and include 'enable', 'disable', and 'display'. 'Enable' adds a domain to the list of valid domains. A user must provide at least one domain. 'Disable' adds a domain to the list of invalid domains. The default for this item is 'none'. 'Display' adds a domain to the list of domains that will have measurement reports. The default for this item is 'all'.

Another feature is an 'instruction identifier'. An instruction identifier may be classified as an opcode (i.e., hexadecimal representation), a 'mnemonic', a 'class', or a 'format'. Only one instruction identifier for each 'verb' may be provided by a user, though multiple elements of that identifier maybe specified. A 'mnemonic' identifier may be alphanumeric text in the case of an instruction or a meta-mnemonic for an instruction (e.g., IFETCH used for specifying instruction fetch exceptions). Since these exceptions happen during the process of instruction fetching, the instruction itself is not known. FIG. 2E illustrates multiple instructions enabled with the 'mnemonic' identifier. A 'class' identifier refers to an instruction's membership in a particular instruction class. Class identifiers can be broad-based groupings like general, control, floating point, hex floating point, binary floating point, I/O, etc., which relate directly to the chapter names of the instructions defined in "Principles of Operations" for IBM's S/390 architecture and z/architecture. Class identifiers may also be internally embedded in the programmable coverage tool (also referred to as 'tool') for creating 'interesting' instruction attributes such as "CC setting", "PSW referencing", "store type", and/or "privileged type", etc. Instructions. The term, 'interesting' refers to data that is unusual or rare, as well as a set defined by and specifically requested by a user.

A 'format' identifier refers to the instruction format type. For example, in IBM's ESAME(™) architecture, an instruction is either one, two, or three halfwords in length and is located in storage on a halfword boundary. Each instruction is in one of 17 basic formats: E, RR, RRE, RRF, R, RXE, RXF, RS, RSE, RSI, RI, RIE, RIL, SI, S, SSE, and SS, with three variations of RRF, two of RS and RSE, and four of SS.

For example, an RR instruction format is illustrated below.

| Op Code | R1 | R2 |
|---|---|---|
| 0 | 8 | 12    15 |

An RRE instruction format is illustrated as follows.

| Op Code | ///////// | R1 | R2 |
|---|---|---|---|
| 0 | 16 | 24 | 28    31 |

An RX instruction format is illustrated below.

| Op Code | R1 | X2 | B2 | D2 |
|---|---|---|---|---|
| 0 | 8 | 12 | 16 | 20   31 |

Other features provided include 'branch resolution type' (e.g., taken or not taken as applicable to branch-type instructions), 'addressing mode' (e.g., 24-bit, 31-bit, 64-bit), 'architecture mode' (e.g., ESAME(™), S/390(™)), 'translation mode' (e.g., real, primary, secondary, home, AR), 'level identifier' (e.g., host, guest), 'type of domain', and 'sequence identifier'. Types of domains include 'exception', 'resulting condition code', 'instruction side effects' (e.g., trace area entry), 'target addressing mode', 'cases' (e.g., defined cases for the instruction), and 'sequence' (e.g., instruction order is significant or instruction result is a 'don't care'). Exceptions refer to the type of program exception applicable for a given instruction as well as 'merged exceptions' (e.g., in IBM's S/390 and ESAME architectures there is a potential for Program-Event Recording (PER) Event. This PER event can be presented alone or concurrently with an instruction exception). A 'target addressing mode' refers to the resultant addressing mode after an instruction execution. For example, IBM's architecture has several instructions that can change the addressing mode (e.g., BSM).

Sequence identifiers are optional, and default to 'no sequence' (e.g., only one instruction in the domain element). When specified, they identify a time order of the elements in the domain. Thus, one can define a sequence of instructions with particular attributes as a single domain element (e.g., AR with CC0, followed by S with CC0, followed by CLR with CC0 which specifies a sequence of three instructions in a specific order, with specific attributes).

FIGS. 2A–2E illustrate sample user-defined coverage domains. FIG. 2A enables one mnemonic instruction (LTR—load and test register) and all of it's resulting condition codes in the S/390(™) architecture, real translation mode, 31-bit addressing mode, at the host level.

FIG. 2B enables one instruction (L—load) and the domain-type exceptions in two groups: page translation and segment translation. Two translation modes are enabled, namely 'primary' and 'secondary'.

FIG. 2C enables the meta-mnemonic instruction, IFETCH, and all associated exceptions. Note that since the instruction fetch exceptions occur prior to decoding the instruction, the meta-mnemonic is a place holder. Two translation modes, 'real' and 'AR' are enabled.

FIG. 2D enables both paths of a branch resolution, 'taken' and 'not-talcen'.

FIG. 2E enables a sequence of three instructions, all having resulting condition codes of 0. There are 8 domain elements that include three instruction sequences in this specification as shown below.

Instruction Sequence

|  | 1 | 2 | 3 |
|---|---|---|---|
| DOMAIN ELEMENT 1 | AR, | S, | CLR |
| DOMAIN ELEMENT 2 | AR, | S, | CL |
| DOMAIN ELEMENT 3 | AR, | A, | CLR |
| DOMAIN ELEMENT 4 | AR, | A, | CL |
| DOMAIN ELEMENT 5 | SR, | S, | CLR |
| DOMAIN ELEMENT 6 | SR, | S, | CL |
| DOMAIN ELEMENT 7 | SR, | A, | CLR |
| DOMAIN ELEMENT 8 | SR, | A, | CL |

A parser (not shown) is provided for translating user-defined domains from their source code into machine code. The parser may be any suitable device generally known in the art. The parsed domains are then used to create an internal structure. The union of all "enabled" user-defined domains, excluding all the "disabled" user-defined domains, become the internal coverage domain 108. Instruction generator 114 and simulator 116 are internal to the testcase generator 117. Instruction generator 114 generates instructions utilizing information contained in internal coverage domain 108. Instruction simulator 116 simulates the execution of the instructions provided by instruction generator 114 for purposes of determining the results of a given instruction during the testcase generation phase and eventually in determining final results of the testcase in verifying a design. Testcase generator 117 includes a coverage feedback and measurement system for facilitating the transfer of testcase information and coverage information as described herein. Internal coverage domain 108 is utilized by testcase generator 117 in making decisions during the generation of testcases in the current generation session. A user is able to specify a domain ranging from a single element to the entire state space of the cross product as described above. This includes the capability of identifying discrete elements of the cross product, as well as the capability of identifying disjoint elements of mutually exclusive cross products (e.g., condition codes and exceptions of a particular instruction). Additionally, testcase generator's 117 internal representation of the coverage domain 108 need only maintain a small amount of information. The reduced size of internal coverage domain 108 reduces the amount of data and processing time in the coverage feedback mechanisms employed during generation. The coverage feedback mechanism employed by testcase generator 117 takes information from the internal coverage domain 108 and can resolve any meta-mnemonics in the instruction generation template by selecting an interesting instruction, optionally overriding the initial state of target machine, and setting up instruction specifics (CC, exception, etc.). Additionally, other coverage reports from cumulative history database(s) (also referred to as prior cumulative history database(s)) 110 can be used to supply information about the prior cumulative history of the defined internal coverage domains. Prior cumulative history database(s) 110 contains the collective history of interesting domains from all prior test generations. The cumulative history may be an exact match of the domain, a subset of the domain, or a superset of the domain whereby the data is extrapolated to fit the internal domains created. (e.g., a generic "access" exception attribute as a domain type can be expanded to each of it's more granular components of addressing, protection, etc.). The instructions to be generated for testing follow a user supplied template 112. Inputs to template 112 can be specific (e.g., an explicit instruction) or generic.

Features of template 112 for instruction generation include an optional 'meta-mnemonic for a coverage selected instruction', 'constraint for coverage to override initial state of the machine' (optional), and 'coverage policy'.

The optional 'meta-mnemonic for a coverage selected instruction' enables the coverage feedback system to select the next instruction. In other words, the meta-mnemonic ID is dynamically resolved at each instruction generation cycle based on the current state of coverage domain 108. Thus, new and unique instructions can be selected to hit uncovered coverage domains using the same instruction skeleton.

'Constraint for coverage to select initial state of the machine' enables the coverage feedback system to select the initial settings of the machine (e.g., addressing mode, translation mode, architecture mode, etc.) overriding the initializations from other files. This is in order to set the same attributes of a selected interesting domain element and permits the same instruction skeleton and same initialization files to be utilized to hit uncovered domain elements in different modes. These other files describe the initializations for machine registers and machine state/mode. An initialization file consists of explicit values for bit ranges in those registers that correspond to architected control bits. Additionally, it also supports a probabilistic mode where the pairs of values and probabilities can be specified. Thus, when setting the initial state, there can be a randomly distributed selection. The constraint of 'Constraint for coverage to select initial state of the machine' enables the coverage feedback system to reselect the initial settings of the machine, thereby overriding the normal initialization process, and allowing the same initialization files to be used while hitting the various states/modes of the machine as specified by the coverage domain elements.

'Coverage policy' refers to a constraint for determining which coverage policy to utilize and includes 'uncovered', 'uniform', 'uncovered-then-switch-to-uniform', and 'user-supplied probability'. 'Uncovered' selects uncovered domain elements including 'session' (e.g., only those not yet covered in the current generation session), and 'cumulative' (e.g., only those elements not yet covered in the current generation session or any prior generation session). The 'uniform' coverage policy also includes 'session' and 'cumulative' options and selects domain elements with a uniform distribution. 'Uncovered-then-switch-to-uniform' coverage policy selects uncovered domain elements until all have been covered, then switches to uniform distribution. 'User-supplied probability' coverage policy applies a user-supplied probability for the domain element.

An example of these features are represented in FIG. 3 for illustrative purposes. FIG. 3 is an instruction template, illustrating the use of a dynamic meta-mnemonic that the coverage feedback mechanism will select at each generation (e.g., CoverageSelected_Op). It also has a policy selected (e.g., Coverage(UncoveredSession)), and a constraint to allow the coverage feedback mechanism to select the initial state (e.g., MachineStateCoverageSelect). The instruction template of FIG. 3 is represented using SIGL (Symbolic Instruction Graph Language), a language introduced by IBM developed for specifying symbolic instruction graphs (SIGs) for use in generating testcases.

Figure 4:
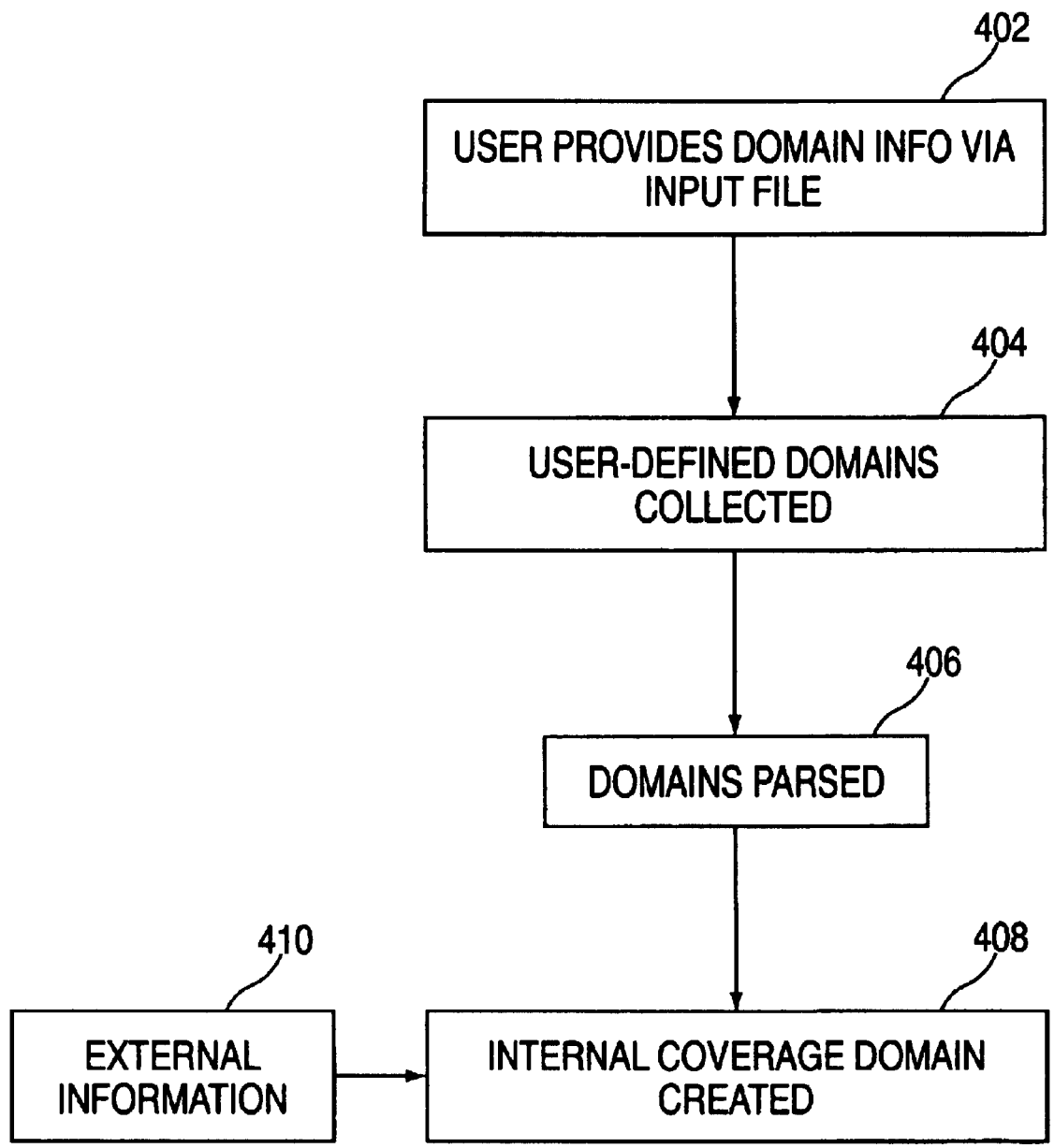
FIG. 4 is a flowchart describing the steps of creating an internal coverage domain in an exemplary embodiment.

FIG. 4 is a flow chart showing steps for establishing an internal coverage domain. A user accesses the tool at step 402 and provides domain information into domain definition input file 102. A number of user-defined domains may be provided by one or more users as desired. The tool collects this domain information as well as other user-provided domains at step 404. The information is parsed into machine-readable code at step 406. The tool checks for all the domain elements that have been enabled and not disabled via the user-defined domains and creates an internal coverage domain 108 using these enabled elements at step 408. The internal coverage domain 108 is used to generate testcases. Current coverage domain update counts are stored in session component 106. History component 104 information (e.g., information from prior cumulative history database 110) contains the prior coverage domain update counts from previous testcases generated before the current generation session. These can be accessed by the tool in order to facilitate testing and feedback to instruction generator 114 at step 410.

Figure 5:
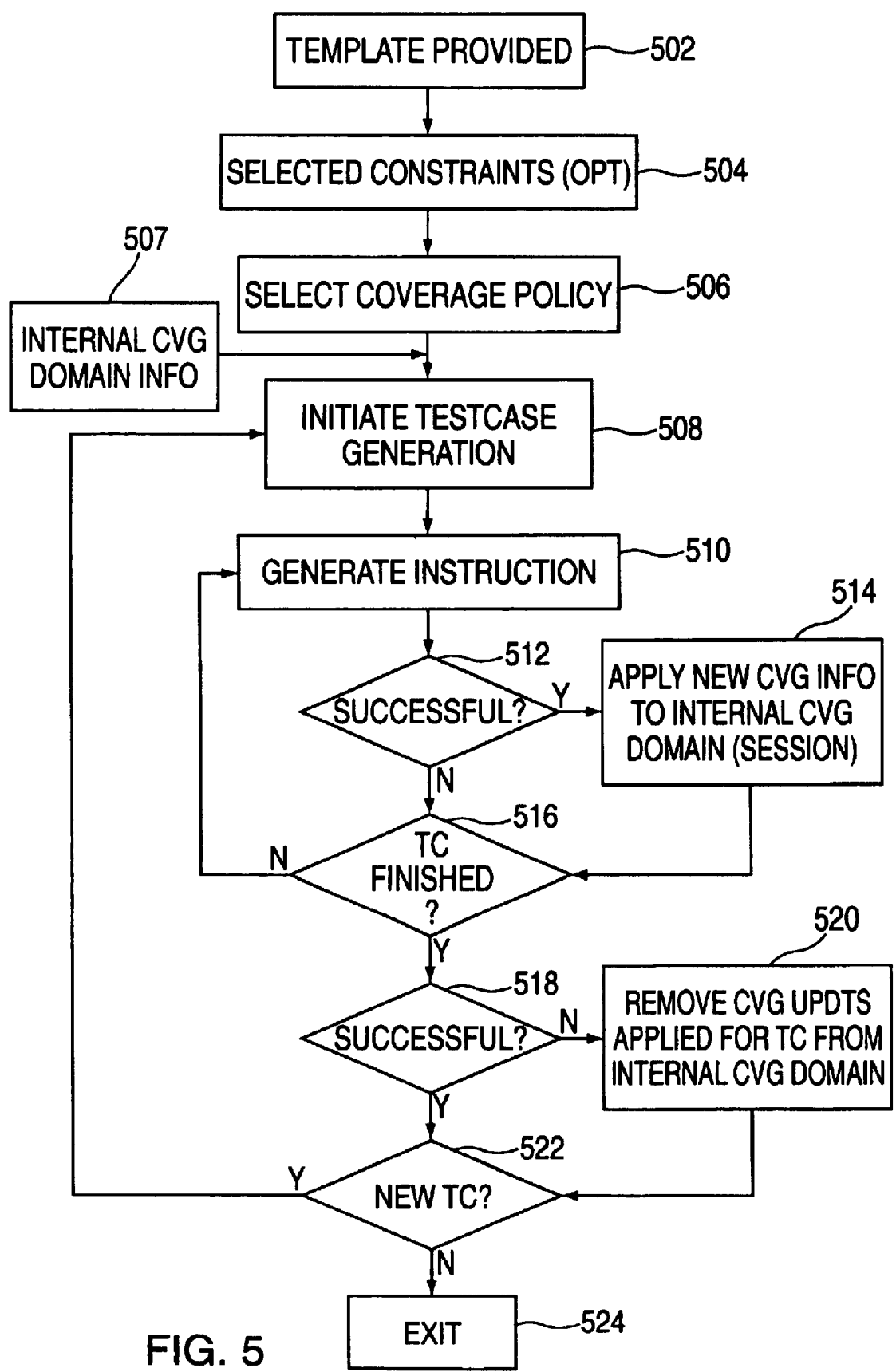
FIG. 5 is a flowchart describing the steps for defining constraints and coverage policies used in guiding instruction selection as well as for guiding subsequent decisions in future generations of a session in an exemplary embodiment.

FIG. 5 illustrates the process of defining constraints and coverage policies for guiding instruction generation. A template 112 is provided for generating instructions at step 502. The user may select from the following constraints at step 504: 'constraints for coverage to select initial state of the machine' (optional) and 'meta-mnemonic for a coverage selected instruction' (optional). Next, the user selects the desired 'coverage policy' at step 506 and as described above. Domain information from internal coverage domain 108 is provided at step 507. Testcase generator 117 implements the testcase generation utilizing information gathered from steps 504–507 at step 508. A testcase instruction is generated at step 510. If the instruction is successfully generated at step 512, the resulting coverage information is applied to internal coverage domain 108 within its session component 106 at step 514. The corresponding internal coverage domain element is updated each time it is encountered when simulating the instruction. If the instruction generation was not successful, or alternatively, once the new coverage information for a successfully generated instruction has been applied to session component 106, the tool checks to see if there is another instruction in the testcase awaiting generation at step 516. If so, testcase generator 117 generates another instruction at step 510. Steps 510–516 may be repeated until all instructions for a testcase have been generated. Once all the instructions for a testcase have been generated at step 516, the tool checks the results of the testcase at step 518. If the testcase is unsuccessful, the coverage updates applied for that testcase are removed from internal coverage domain 108 at step 520. If the testcase was successful, the tool checks to see if there is another testcase awaiting execution at step 522. If so, the process reverts to step 508 whereby the new testcase is initiated. Steps 508–522 may be repeated a number of times until all testcases have been generated. Once all testcases have been generated at step 522, testcase generator 117 exits the process at step 524. Reports can be generated after each testcase or upon completion of all the testcases as desired.

The tool allows a user to generate a comprehensive test suite including a collection of testcases to profile a new instruction and/or architected environment or result. This set may include an example of each possible domain element in the user-defined domain. The tool also provides user control over coverage policy including biasing certain generation cases with specific probabilities, having uniform distribution on the specific domain, and generating testcases that hit uncovered domain elements. This applies to both the current generation session and/or to all the cumulative generation sessions to date. It also allows the user to switch to a uniform distribution coverage policy once all domain elements are covered.

The tool also allows for profiling of initialization settings including measuring and validating the user initialization settings to insure they enable reaching all elements of a specified domain. Further the tool enables a user to profile a generation tool including measuring and validating the effectiveness and efficiency of the generation tool itself in covering a specified domain. This insures that all domain elements can be generated and determines efficiency in the generation (e.g., checking to see if there are any inordinate amount of aborts, etc.).

Figure 6:
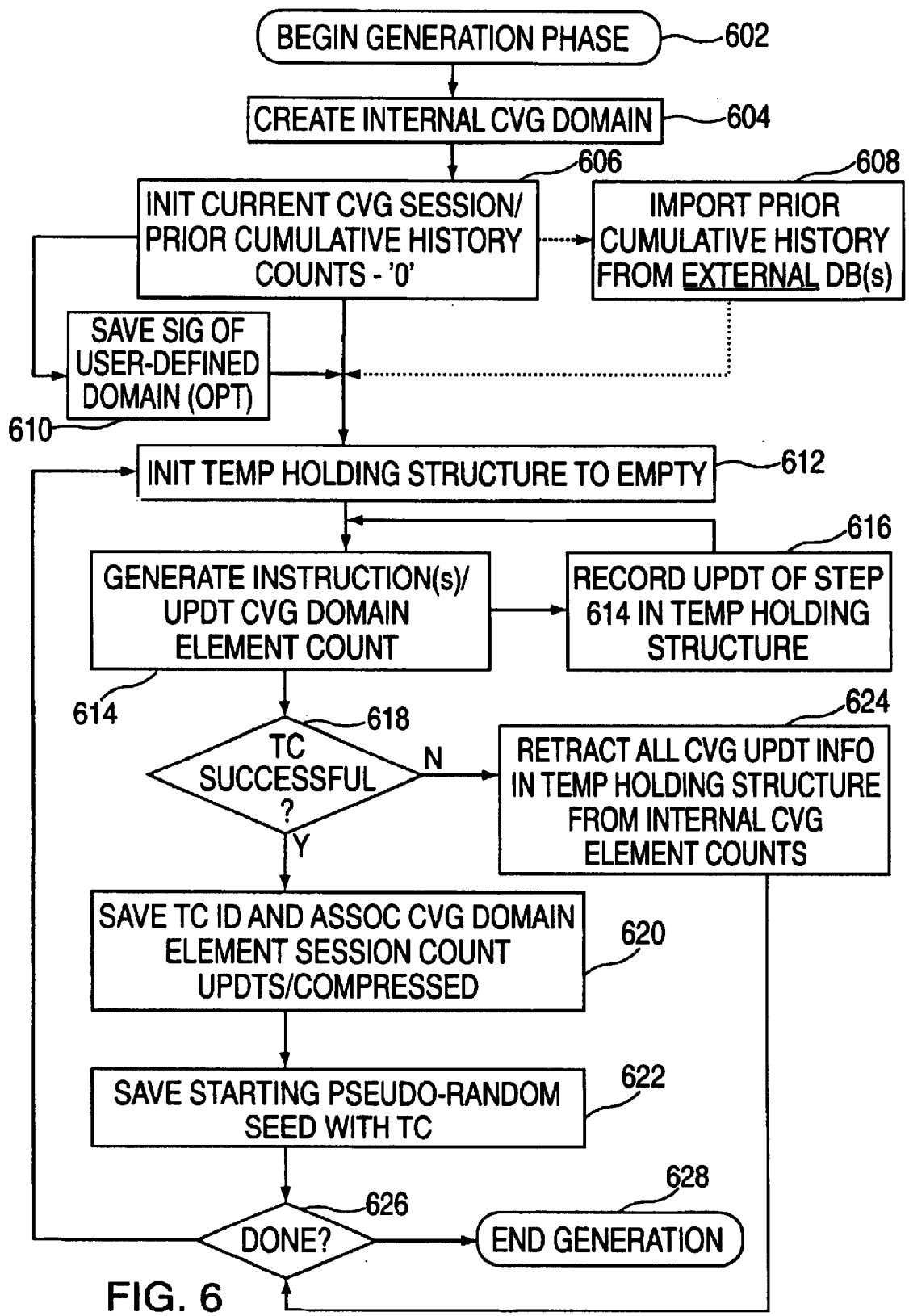
FIG. 6 is a flowchart describing the process of constructing a generation file for the defined coverage domain for a testcase 'n' in an exemplary embodiment of the invention.
Figure 8:
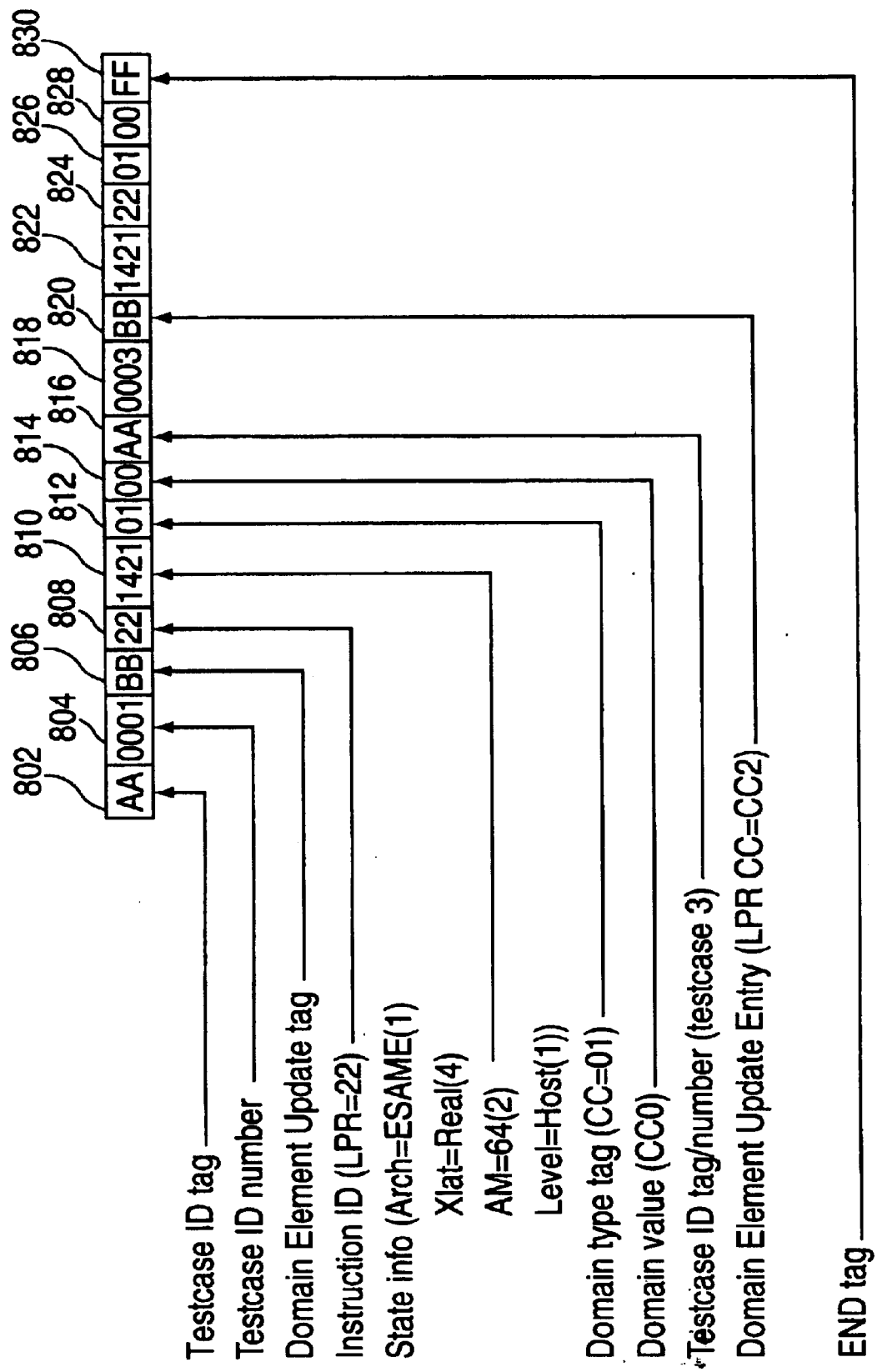
FIG. 8 is a sample compressed domain history for storing generation data used in regenerating a testcase in an exemplary embodiment.

FIG. 6 illustrates the process of constructing a regeneration file for the defined coverage domain for a testcase 'n'. To facilitate regeneration, the state of the internal user-defined coverage domain at the time of generating testcase 'n' must be recreateable. The testcase generation phase begins at step 602. The internal coverage domain 108 is created (as described in FIG. 4) at step 604. Pertinent information is retained as described herein. The session count for each element in internal coverage domain session component 106, as well as the cumulative history count from prior testcases for each element in the internal coverage domain cumulative history component 104, are initialized to 'zeros' at step 606. Alternatively, information for the cumulative history counts may be imported from prior cumulative history database(s) 110 at step 608. A signature representing the internal coverage domain is optionally saved at step 610. A temporary holding structure for holding coverage element updates for the current testcase is initialized to be empty at step 612. During the simulation phase of each instruction, each element of the internal coverage domain that is encountered has it's session count updated at step 614. Each of these updates is also recorded in a temporary holding structure at step 616. If the testcase is successful in generating at step 618, the testcase ID is saved followed with all the coverage updates associated with that ID at step 620. This may be accomplished by writing to a separate external coverage update history file (also referred to as "regeneration" file). This step utilizes a compressed form for the information of the testcase ID and associated coverage updates that reduce the amount of file space required and increase speed in the reconstruction phase. A sample compressed form of a domain element update is illustrated in FIG. 8. The starting pseudo-random seed is saved along with the testcase at step 622. If the testcase is not successful at step 618, all of the coverage update information in the temporary holding structure is retracted from the internal coverage database's counts at step 624 in order to prevent recording unsuccessful attempts. Steps 614–6 may be repeated until all instructions of the testcase have been generated, and steps 612–624 may be repeated until all testcases have been generated at step 626. Upon completion, the generation phase is exited and a termination tag is put at the end of the coverage update history file ("regeneration" file) at step 628.

Once the testcase generation phase is complete, a user can reproduce a testcase (e.g., testcase 'n'). The user initiates the regeneration phase at step 702. Internal coverage domain 108 is created (as described in step 408 of FIG. 4) at step 704. The session count for each element in the internal coverage domain session component 106, as well as the cumulative history from prior testcases count for each element in the internal coverage domain cumulative history component 104 are initialized to 'zeros' at step 706. Alternatively, information for the cumulative history counts may be imported from cumulative history database(s) 110 at step 708. The ID of testcase "n" is verified to insure it is validly in the range initially encountered/saved at step 710. This may be accomplished by checking the ID against the saved information of the testcase IDs and associated coverage domain updates in the "regeneration" or coverage domain update history file. Optionally, a saved domain signature from the "regeneration" file (as described in step 710) may be verified to ensure using the same user supplied domain definition at step 712. Each testcase ID and associated coverage domain updates for each testcase 1 through n−1 are applied at step 714. This may be accomplished by locating each domain element of the testcases 1 through n−1 and updating the session count by one. The starting pseudo-random seed is set to seed 'n' at step 716.

Thus, the coverage domain state at the generation time of testcase 'n' is replicated, and thus, testcase 'n', will have the same coverage domain inputs and starting pseudo-random seed governing the decisions in that testcase and therefore becomes reproducible at step 718. Upon completion, the regeneration phase is exited at step 720.

The method described above is extendable to coverage domains which utilize sequences of instructions and/or instruction results in the domain definition. Here, the prior sequence of encountered instructions and instruction results must be saved while generating to apply to the current list of coverage domain updates. When the current testcase is updating an element of the internal coverage domain, each combination of this current coverage domain update is applied with each member of the list of the prior sequence coverage domain updates. The information recorded in the temporary holding structure would be increased to hold the testcase ID as before but also include the sequence information with the associated coverage domain update for each element in the sequence.

The following is an example application. Here the defined coverage domain is the instruction, Load Positive Register (LPR), and its resulting condition codes (CC) of 0, 1, and 2. Additionally the instruction, Load and Test Register (LTR), with only CC0 is also included in the defined domain. Both of these instructions are enabled for the ESAME (™) architecture in the 64-bit addressing mode under real translation at the host level as illustrated in FIG. 9. FIG. 10 illustrates a sample instruction template file for generating either one or two instructions per testcase, with a coverage policy of hitting "uncovered" cumulative coverage domain elements for this generation session.

The testcase generation begins, and the internal coverage domain is built from parsing the user-defined domain file 102 as described in FIG. 4 and in FIG. 6 at step 604, and the session and cumulative counts are initialized to zeros as described in step 606. The prior cumulative coverage history information from prior cumulative history component 104 and/or cumulative history database 110 is:

ESAME, Host, Real, 64 bit Addressing mode:
  LPR, CC0, cumulative count=0
  LPR, CC1, cumulative count=1
  LPR, CC2, cumulative count=0
  LTR, CC0, cumulative count=0

Thus, the initial state of internal coverage domain 108 after applying the prior cumulative history (step 608) is:

ESAME, Host, Real, 64 bit Addressing mode:
  LPR, CC0, session count=0, prior cumulative count=0
  LPR, CC1, session count=0, prior cumulative count=1
  LPR, CC2, session count=0, prior cumulative count=0.
  LTR, CC0, session count=0, prior cumulative count=0

The temporary holding structure for updates to the domain element counts for the current testcase is set to empty as described in step 612. The testcase ID is set to 1 and the starting psuedo-random seed is selected as 0×abcdabcd. The count of 1 (picked from the template specified range 1 to 2) is randomly selected for the number of instructions to generate for this testcase. The selection set for replacing the meta-mnemonic is LPR:{CC0, CC2} and LTR{CC0}, since LPR{CC1} is already marked as encountered in the cumulative history. LPR is randomly chosen from this set, then CC0 is randomly selected for LPR from the set of available and cumulatively uncovered domain elements {CC0, CC2}.

Since the machine state coverage select constraint is in the instruction template (see generally FIG. 10), the state of the machine is set to ESAME architecture mode, Host mode, real translation, and 64 bit addressing mode. The instruction LPR is generated and then simulated. When the simulation of the LPR instruction updates the condition code to CC0, the coverage domain element LPR{CC0} session count is updated to 1. The temporary holding structure (i.e., list of current domain updates for this testcase) is updated to include testcase ID=1, and LPR{CC0}. No further instructions are generated and this testcase generated successfully. Then coverage history update file (also referred to as regeneration file) is updated to reflect the list of current domain updates. In this case, it would be ID=1, LPR{CC0} as shown generally in FIG. 8 at 802–814.

The temporary holding structure for updates to the domain element counts for the current testcase is set to empty as described in step 612 of FIG. 6. Testcase generation is not yet complete, so a new testcase generation is started. Testcase ID is now set to 2, and the starting psuedo-random seed is selected as 0x11111111. The count of 2 is randomly selected for the number of instructions to generate for this testcase. The selection set for replacing the meta-mnemonic is LPR: {CC2} and LTR{CC0}, since LPR{CC0} session count is 1 as testcase 1 updated LPR{CC0}, and the prior cumulative history indicates LPR{CC1} is already covered. LPR is randomly selected as the instruction replacing the meta-mnemonic for the first instruction. Again the machine state is re-initialized as in the first testcase. CC2 is then selected as the resulting condition code since the only domain element for LPR not yet covered in the session or prior cumulative testcases. The LPR instruction is generated and then simulated. When the simulation of the LPR instruction updates the condition code to CC2, coverage domain element LPR{CC2} session count updated to 1. The list of current domain updates is updated to include ID=2, LPR{CC2}. The selection set for the second instance of the meta-mnemonic is only LTR {CC0}, as LPR {CC2} was selected as the first instruction of this testcase, LPR{CC0} has a session count of 1 and selected in the testcase ID=1, and LPR{CC1} has a prior cumulative history count of 1. CC0 is then selected for LTR, and the LTR instruction is then generated, and then simulated. The coverage domain element LTR{CC0} session count is updated to 1. The list of current domain updates is updated to be ID=2, LPR{CC2}, LTR{CC0}. During the completion of generating the testcase an abort condition was encountered. Since this testcase was unsuccessful, each domain update in current list of domain updates is retracted from current domain count. Thus, the session counts for the domain elements return to the same value as after testcase 1.

ESAME, Host, Real, 64 bit Addressing mode:
   LPR, CC0, session count=1, prior cumulative count=0
   LPR, CC1, session count=0, prior cumulative count=1
   LPR, CC2, session count=0, prior cumulative count=0
   LTR, CC0, session count=0, prior cumulative count=0

The temporary holding structure for updates to the domain element counts for the current testcase is set to empty. Testcase generation is not yet complete, so a new testcase generation is started. Testcase ID is now set to 3, and the starting psuedo-random seed is selected as 0x12341234. The count of 1 is randomly selected for the number of instructions to generate for this testcase. The selection set for replacing the meta-mnemonic is LPR{CC2} and LTR{CC0}1, since LPR{CC0} session count is 1 as testcase 1 updated LPR{CC0}, and the prior cumulative history indicates LPR{CC1} is already covered. LPR is randomly selected as the instruction replacing the meta-mnemonic for the first instruction. Again the machine state is re-initialized as in the first testcase. CC2 is then selected as the resulting condition code since the only domain element for LPR not yet covered in the session or prior cumulative testcases. The LPR instruction is generated and then simulated. When the simulation of the LPR instruction updates the condition code to CC2, coverage domain element LPR{CC2} session count updated to 1. The list of current domain updates is updated to include ID=3, LPR{CC2}. No more instructions are generated and this testcase generated successfully. Then coverage update history file is updated to reflect the list of current domain updates, here adding ID=3, LPR{CC2} as illustrated generally in FIG. 8 at 816–828.

After all testcases have been generated, the "regeneration file" or coverage update history file contains ID=1, LPR{CC0}; ID=3, LPR{CC2} and end tag (also referred to as termination tag) 830 as shown in FIG. 8.

Figure 7:
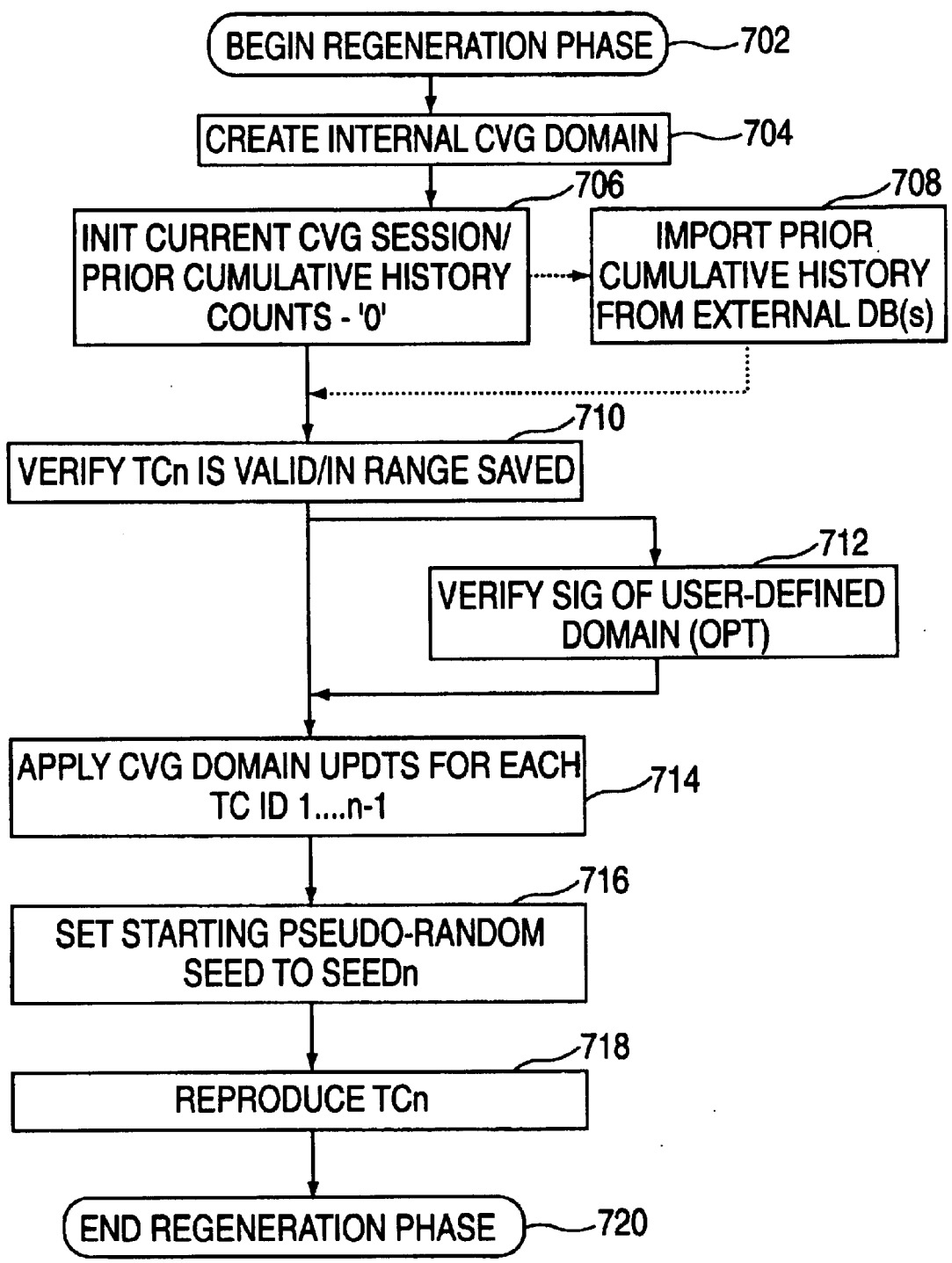
FIG. 7 is a flowchart describing the process of regenerating a testcase, 'n' in an exemplary embodiment.

Regeneration of testcases 1–3 is now reproducible. For example, to regenerate testcase 3, the internal coverage domain is built from parsing the user-defined domain file as described in step 704 of FIG. 7, and the session and cumulative counts are initialized to zero as in step 706.

The prior cumulative coverage history information from prior cumulative history component 104 and/or prior cumulative history database 110 is:

ESAME, Host, Real, 64 bit Addressing mode:
   LPR, CC0, cumulative count=0
   LPR, CC1, cumulative count=1
   LPR, CC2, cumulative count=0
   LTR, CC0, cumulative count=0

Thus, the initial state of the internal coverage domain after applying the prior cumulative history at step 708 is:

ESAME, Host, Real, 64 bit Addressing mode:
   LPR, CC0, session count=0, prior cumulative count=0
   LPR, CC1, session count=0, prior cumulative count=1
   LPR, CC2, session count=0, prior cumulative count=0
   LTR, CC0, session count=0, prior cumulative count=0

The prior cumulative coverage information file from step 710 is accessed and the regenerated testcase ID=3 is checked to insure it is in the range saved. The signature of the internal domain file is calculated and then optionally checked with the saved signature of the domain file to insure integrity of the regeneration in step 712. Each testcase's domain updates prior to ID=3 are applied as in step 714. Thus ID=1, LPR{CC0} is applied since the ID is less than 3. Thus, the current coverage domain state is reconstructed to be the same as it was during the initial generation sequence for testcase ID 3.

LPR, CC0, session count=1, prior cumulative count=0
   LPR, CC1, session count=0, prior cumulative count=1
   LPR, CC2, session count=0, prior cumulative count=0
   LTR, CC0, session count=0, prior cumulative count=0

The same starting seed (0'12341234) for testcase 3 is applied and testcase 3 will again go through and regenerate identically (i.e., pick LPR{CC2}) without having to regenerate all prior testcases.

As described above, domain element update histories may be compressed as illustrated in FIG. 8 in order to minimize the space necessary in storing generation information.

FIG. 11 details the format of the compressed update history file. FIG. 12 details the format for handling domain elements that are sequences of instructions/instruction results. An extension for the domain element update history is to initially store the state of the internal coverage domains with the initial cumulative counts from the prior coverage databases. This would reduce the need to regenerate the internal coverage database from parsing the user-supplied domain definition, but recreate it from the entries in the domain element update history. This would also reduce the need to retain and use the signature of the coverage domain, and remove the need to reread any of the cumulative coverage reports from the databases as this data would already be encapsulated in the compressed domain element update history file.

The defined coverage domain element contains counts of occurrences of this particular element, both in the total of occurrences in this generation session and optionally all prior generation sessions. The count for all the prior generation sessions can come from importing the data from accumulation of individual sessions from various coverage recording databases. The state of the defined coverage domain element(s) can then be utilized decision points that reference that particular coverage information. A testcase can be comprised of many distinct components (e.g. several instructions). Thus, the number of interesting elements in this set of pertinent coverage information is dynamic within a particular testcase and across testcases. The extent of the user-defined coverage domains and the application of different coverage policies (e.g., selecting uncovered domain elements in the current session, selecting uncovered domain elements in all the cumulative sessions, uniform distribution, user-defined distribution, etc.) all affect the number of elements in the set used to guide selections in generation. As before, the pseudo-random seed is used at each decision point, and is dynamic. Updates to the current coverage domain state occur during the generation of a testcase, thus these new dynamic state changes (coverage element updates) also influence the selection of future decisions not only in this testcase but subsequent testcases.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for facilitating coverage feedback testcase regeneration reproducibility, comprising:
   constructing a regeneration file for a testcase during execution of said testcase, comprising:
      creating an internal coverage domain comprising domain elements;
      initializing a session count field to zero for each element in said internal coverage domain;
      initializing a prior cumulative history count field to zero;
      initializing a temporary holding structure to empty, said temporary holding structure operable for storing testcase data updates relating to instructions generated for a current testcase session;
   during simulation of each instruction in said current testcase session:
      updating said session count field for each element of said internal coverage domain encountered during execution;
      storing coverage update information for each element of said internal coverage domain encountered during execution in said temporary holding structure;
      for each successfully generated testcase, saving a corresponding:
         testcase ID;
         starting pseudo-random seed; and
         coverage updates in said regeneration file;
      for each unsuccessfully generated testcase, retracting corresponding testcase data updates from said temporary holding structure; and
      associating a termination tag with said testcase via said regeneration file.

2. The method of claim 1, further comprising:
   reproducing said testcase, comprising:
      creating an internal coverage domain comprising domain elements;
      initializing a session count field to zero for each element in said internal coverage domain;
      initializing a prior cumulative history count field to zero;
      verifying an ID associated with a testcase to be reproduced;
      locating each domain element of testcases preceding said testcase to be reproduced and updating said session count field by one;
      setting a starting pseudo-random seed to correspond with said testcase to be reproduced;
      wherein a coverage domain state at generation of said testcase to be reproduced is replicated and associated domain inputs and starting pseudo-random seed for said testcase to be reproduced are retrieved resulting in reproducibility of said testcase.

3. A storage medium encoded with machine-readable computer program code for facilitating coverage feedback testcase generation reproducibility, the storage medium including instructions for causing a computer to implement a method comprising:
   constructing a regeneration file for a testcase during execution of said testcase, comprising:
      creating an internal coverage domain comprising domain elements;

initializing a session count field to zero for each element in said internal coverage domain;
initializing a prior cumulative history count field to zero;
initializing a temporary holding structure to empty, said temporary holding structure operable for storing testcase data updates relating to instructions generated for a current testcase session;
during simulation of each instruction in said current testcase session:
  updating said session count field for each element of said internal coverage domain encountered during coverage execution;
  storing coverage update information for each element of said internal coverage domain encountered during execution in said temporary holding structure for each successfully generated testcase, saving a corresponding:
    testcase ID;
    starting pseudo-random seed; and
    coverage updates in said regeneration file;
  for each unsuccessfully generated testcase, retracting corresponding testcase data updates from said temporary holding structure; and
  associating a termination tag with said testcase via said regeneration file.

4. The storage medium of claim 3, further comprising instructions for causing a computer to implement a method, comprising:
reproducing said testcase, comprising:
  creating an internal coverage domain comprising domain elements;
  initializing a session count field to zero for each element in said internal coverage domain;
  initializing a prior cumulative history count field to zero;
  verifying an ID associated with a testcase to be reproduced;
  locating each domain element of testcases preceding said testcase to be reproduced and updating said session count field by one;
  setting a starting pseudo-random seed to correspond with said testcase to be reproduced;
  wherein a coverage domain state at generation of said testcase to be reproduced is replicated and associated domain inputs and starting pseudo-random seed for said testcase to be reproduced are retrieved resulting in reproducibility of said testcase.

* * * * *